(12) United States Patent
He (10) Patent No.: US 10,718,984 B2
(45) Date of Patent: Jul. 21, 2020

(54) DISPLAY PANEL AND REPAIR METHOD THEREOF

(71) Applicant: HKC Corporation Limited, Shenzhen, Guangdong (CN)

(72) Inventor: Huailiang He, Shenzhen (CN)

(73) Assignee: HKC CORPORATION LIMITED, Shenzhen, Guangdong (CN)

( * ) Notice: Subject to any disclaimer, the term of this patent is extended or adjusted under 35 U.S.C. 154(b) by 207 days.

(21) Appl. No.: 15/738,718

(22) PCT Filed: Oct. 20, 2017

(86) PCT No.: PCT/CN2017/107024
§ 371 (c)(1),
(2) Date: Dec. 21, 2017

(87) PCT Pub. No.: WO2019/047339
PCT Pub. Date: Mar. 14, 2019

(65) Prior Publication Data
US 2019/0079361 A1    Mar. 14, 2019

(30) Foreign Application Priority Data
Sep. 11, 2017    (CN) .......................... 2017 1 0813633

(51) Int. Cl.
*G02F 1/1362*    (2006.01)
(52) U.S. Cl.
CPC .................. *G02F 1/136259* (2013.01); *G02F 2001/136263* (2013.01)
(58) Field of Classification Search
CPC .............. G02F 1/136259; G02F 2001/136263
See application file for complete search history.

(56) References Cited

U.S. PATENT DOCUMENTS

2007/0058463 A1* 3/2007 Huang .............. G02F 1/136259
 365/200
2010/0157190 A1* 6/2010 Lee ..................... G02F 1/13452
 349/54

FOREIGN PATENT DOCUMENTS

CN    101211020 A    7/2008
CN    102945647 A    2/2013

OTHER PUBLICATIONS

International Search Report dated Jan. 4, 2018 in PCT/CN2017/107024.

* cited by examiner

*Primary Examiner* — Melissa J Koval
*Assistant Examiner* — Haidong Zhang
(74) *Attorney, Agent, or Firm* — Muncy, Geissler, Olds & Lowe, P.C.

(57) ABSTRACT

A repair method of a display panel comprises: disposing a repair line on a non-display area; dividing the repair line into a first, a second, and a third segments sequentially connected; electrically connecting the first end of the target data line to an input end of the gate driving chip through the first segment; dividing the second segment of the repair line into a first and second parts, wherein the second part electrically connects the operational amplifiers (OPAs) of the gate driving chip for amplifying the repair signal transmitted through the repair line, and the first part electrically connects two gate driving chips; electrically connecting the last output end of the gate driving chip to the second end of the target data line through the third segment, for transmitting the repair signal amplified by the (OPA) to the breakpoint through the second end of the target data line.

20 Claims, 4 Drawing Sheets

DISPLAY PANEL AND REPAIR METHOD THEREOF

BACKGROUND OF THE INVENTION

Field of Invention

The present invention generally relates to a display technology field, and especially relates to a display panel and a repair method thereof.

Description of Related Art

Thin film transistor liquid crystal display (TFT-LCD) is one main stream of the current flat panel displays, and has become an important display medium in current information technology (IT) products and video products. A driving principle of the thin film transistor liquid crystal display (TFT-LCD) is that R/G/B compression signals, controlling signals and an energy are electrically coupled to a connector of a printed circuit board (PCB) through wiring lines on a system main board, and data information is processed by a timing controller (TCON) of the printed circuit board (PCB) and then connected with a display area through a source-chip on film (S-COF) and a gate-chip on film (G-COF), so that the thin film transistor liquid crystal display (TFT-LCD) can get a required power and signals.

In practical application, the thin film transistor liquid crystal display (TFT-LCD) usually has many defects resulting from manufacturing defects. These defects include, for example, a data line breakpoint defect. A current repair method includes disposing a repair line on a non-display area for transmitting data to the breakpoint. However, since the transmission path of repair line is longer than a normal transmission path, and the impedance of the repair line is larger than the impedance of a normal line, a voltage transmitted to the breakpoint will be less than a target voltage because of the impedance and capacitance effects of the repair line. Therefore, a data line needs to be connected to a printed circuit board (PCB), and to dispose an operational amplifier (OPA) with large driving capability on the printed circuit board (PCB) for providing large output push capability of the repair line.

SUMMARY OF THE INVENTION

For resolving the technical problems above-mentioned, the objects of the present invention are to provide a display panel and a repair method thereof. The present invention can reduce the impedance of a repair line for the display panel.

In one perspective, in the present repair method of a display panel, the display panel comprises: a display area, a non-display area, and a target data line, the target data line including a first end, a second end disposed on both sides of the display area, and a breakpoint in the display area; the display panel further comprising a plurality of gate driving chips, and a plurality of operational amplifiers (OPAs) disposed in the gate driving chips. The present repair method of a display panel comprises:

the display panel comprising: a display area, a non-display area, and a target data line, the target data line including a first end and a second end disposed on both sides of the display area, and the target data line including a breakpoint in the display area; the display panel further comprising a plurality of gate driving chips, and a plurality of operational amplifiers (OPAs) disposed in the gate driving chips;

disposing a repair line on the non-display area for transmitting a repair signal to the breakpoint of the target data line;

dividing the repair line into a first segment, a second segment, and a third segment sequentially connected to each other;

electrically connecting the first end of the target data line to an input end of the gate driving chip through the first segment;

dividing the second segment of the repair line into a first part and a second part, wherein the second part is disposed in the gate driving chip, the input end of the gate driving chip is electrically connected to an input end of the operational amplifier (OPA) through the second part, and an output end of the operational amplifier (OPA) is electrically connected to the output end of the gate driving chip through the second part for amplifying the repair signal transmitted through the repair line; electrically connecting the output end of the gate driving chip to an input end of the next gate driving chip through the first part; and electrically connecting the last output end of the gate driving chip to the second end of the target data line through the third segment, for transmitting the repair signal amplified by the operational amplifier (OPA) to the breakpoint through the second end of the target data line.

In one embodiment of the present invention, the repair method the display panel further comprises: sequentially connecting the plurality of gate driving chips to each other through the first part of the second segment of the repair line.

In one embodiment of the present invention, the repair method the display panel further comprises: electrically connecting the plurality of operational amplifiers (OPAs) of the gate driving chips in series through the second part of the second segment of the repair line for conducting and amplifying the repair signals in cascade.

In one embodiment of the present invention, the repair method the display panel further comprises:
the target data line including a plurality of target sub-data lines;
a plurality of sub-repair lines disposed in the repair line corresponding to the plurality of target sub-data lines; and
the second parts of the plurality of sub-repair lines are electrically connected to the different operational amplifiers (OPAs) in the gate driving chips respectively.

In one embodiment of the present invention, the repair method the display panel further comprises:
the target data line including a plurality of target sub-data lines;
a plurality of sub-repair lines disposed in the repair line corresponding to the plurality of target sub-data lines; and
the first parts of the plurality of sub-repair lines are electrically connected to the different gate driving chips respectively.

In another perspective, the present display panel comprises: a display area; a non-display area; a plurality of gate driving chips, wherein a plurality of operational amplifiers (OPAs) are disposed in the plurality of gate driving chips; a target data line, the target data line including a first end and a second end disposed on both sides of the display area, and including a breakpoint in the display area; a repair line disposed in the non-display area for transmitting repair signals to the breakpoint of the target data line, the repair line including a first segment, a second segment, and a third segment sequentially connected to each other; the plurality of operational amplifiers (OPAs) electrically connected to the repair line for amplifying the repair signals transmitted by the repair line; the first segment disposed for electrically connecting the first end of the target data line to an input end of the gate driving chips; the second segment divided into a first part and a second part, wherein the second part is disposed in the gate driving chips, the second part is used for electrically connecting the input end of the gate driving chips to an input end of the operational amplifier (OPA), and for electrically connecting an output end of the operational amplifier (OPA) to an output end of the gate driving chips for amplifying the repair signals transmitted by the repair line, and the first part is used for electrically connecting the output end of one gate driving chips to the input end of the next gate driving chips; and the third segment disposed for electrically connecting the last output end of the gate driving chips to the second end of the target data line.

In one embodiment of the present invention, the plurality of the operational amplifiers (OPAs) of the gate driving chips are electrically connected in series through the second part of the second segment of the repair line for conducting and amplifying the repair signals in cascade.

In one embodiment of the present invention, the target data line includes a plurality of target sub-data lines; a plurality of sub-repair lines are disposed in the repair line corresponding to the plurality of target sub-data lines; and second parts of the plurality of sub-repair lines are electrically connected to the different operational amplifiers (OPAs) in the gate driving chips respectively.

In one embodiment of the present invention, the target data line includes a plurality of target sub-data lines; a plurality of sub-repair lines are disposed in the repair line corresponding to the plurality of target sub-data lines; and first parts of the plurality of sub-repair lines are electrically connected to the different gate driving chips respectively.

In the present display panel and the repairing method thereof, the second segment of the repair line is divided into the first part and the second part, wherein the second part is disposed in the gate driving chip, and the wiring process of the second part in the gate driving chip is usually more advanced than the wiring process of the non-display area of the display panel. Therefore, the impedance of the second part of the second segment of the repair line in the gate driving chip is far less than wirings in the non-display area, and therefore can be accordingly ignored, wherein the impedance and uniformity of the second part of the second segment of the repair line are better than the wirings in the non-display area. That is, according to the embodiment above-mentioned, the impedance of the present repair line is far less than the impedance of a conventional repair line, so that the requirements for the operational amplifier (OPA) are reduced, and a cost for wiring process is reduced, and the wiring layout is easily implemented. Comparing with conventional repair line wirings all passing through the non-display area, the repair line wirings of the present invention are transmitted through both the non-display area and the gate driving chip, and the operational amplifier (OPA) is disposed in the gate driving chip for improving data driving capability of the repair line. According to the embodiment of the present invention, the transmission path of the repair line in the non-display area is shortened and the impedance of the repair line is also reduced, so that the requirements for the operational amplifier (OPA) are accordingly reduced. Although the output capability of the present operational amplifier (OPA) in the gate driving chip is lower than the output capability of conventional operational amplifier (OPA), the impedance of the present repair line is correspondingly reduced to meet the driving requirements of the operational amplifier (OPA). The operational amplifier (OPA) with improved repair line push capability is the operational amplifier (OPA) disposed in the gate driving chip, but not the operational amplifier (OPA) disposed on the printed circuit board (PCB), so that the repair line wirings is optimized. The advantages of the present invention include that an original operational amplifier (OPA) in the gate driving chip can be used for improving push capability without using any extra operational amplifier (OPA), so that a circuit layout is optimized, and an extra operational amplifier (OPA) and mounting cost are saved. Therefore, product cost is reduced, and power consumption is reduced, and effects for peripheral components are accordingly reduced.

BRIEF DESCRIPTION OF THE DRAWINGS

For further description and clarification of the present embodiments and technique solutions, the following drawings are provided as referred to following embodiments throughout the description of the present invention. It is apparently that the drawings are only examples for implementing the objects of the present invention, and a variety of other drawings can be obtained from these figures according to other embodiments.

DESCRIPTION OF THE PREFERRED EMBODIMENTS

The drawings as referred to following embodiments throughout the description of the present invention are examples for clearly implementing the objects of the present invention. It should be understood that the embodiments and the drawings are examples for illustrative purpose only, or just show the interrelations between the components, but not to be construed as limitations to the scope of the present invention.

Figure 1:
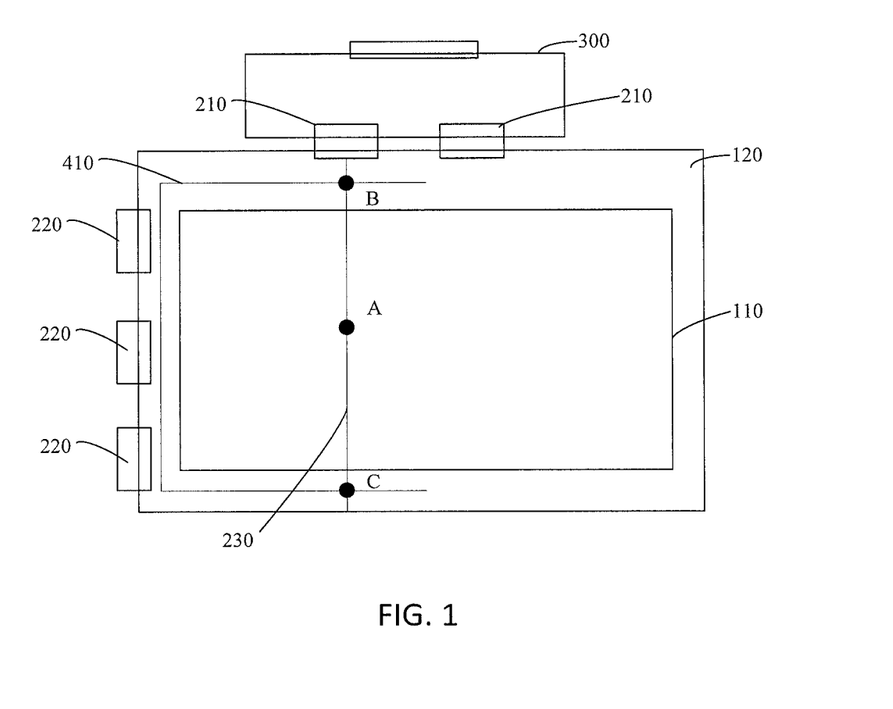
FIG. 1 shows an exemplary repair method of a display panel.

FIG. 1 shows an exemplary repair method of a display panel. As shown in FIG. 1, there is a breakpoint A on a data line, resulting in a disconnected line and unable to display the data between the breakpoint A and ground. For repairing the disconnected line above-mentioned, overlapping points B and C of a repair line 410 and the data line are laser welded, so that a data of AB segment can be transmitted through the data line, and a data of AC segment can be transmitted through the repair line 410 to achieve the repair object. The transmission path for transmitting data to the breakpoint A through the repair line 410 is longer than the normal transmission path. For reducing the impedance and capacitance effects of the repair line 410 during data transmission to let a voltage transmitted to the breakpoint A less than a target voltage, the repair line 410 needs to be connected to a printed circuit board (PCB) to increase an output push capability of the repair line through an operational amplifier (OPA).

Figure 2:
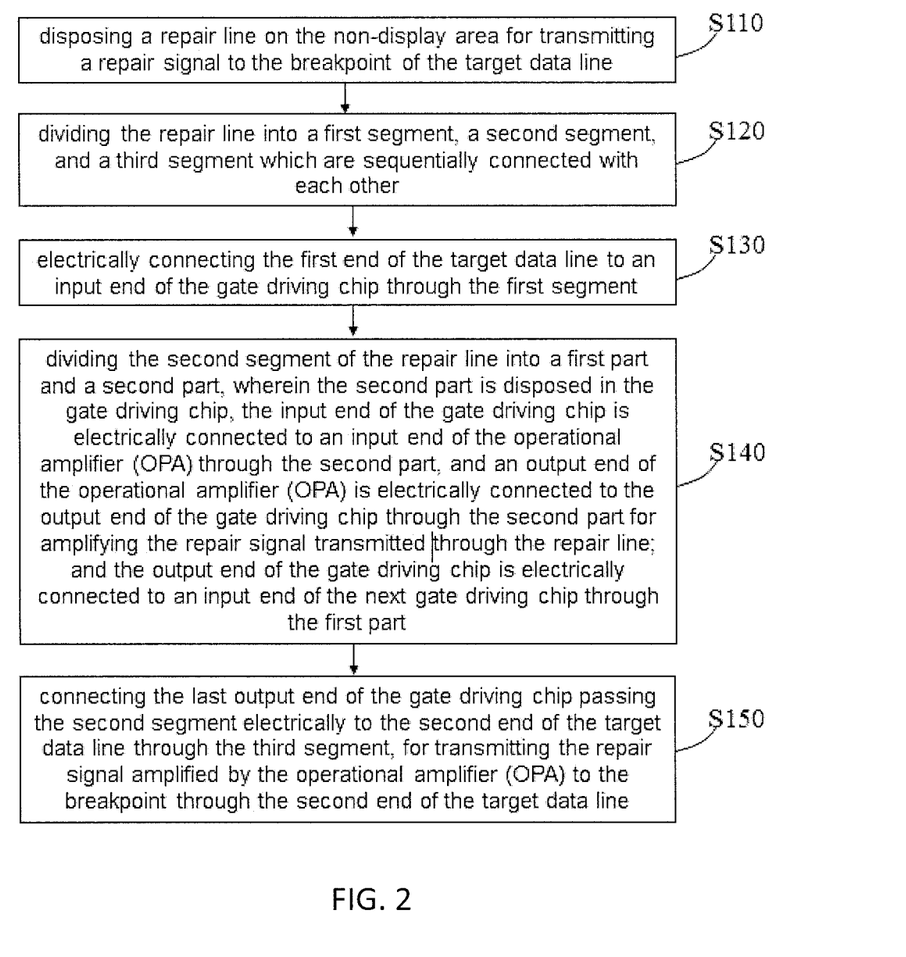
FIG. 2 shows exemplary flow charts of a repair method of a display panel.

FIG. 2 shows exemplary flow charts of a repair method of a display panel. As shown in FIG. 2, a display panel comprises: a display area, a non-display area (a fan out area) and a target data line. The non-display area is disposed around a peripheral of the display area. The target data line includes a first end and a second end disposed on both sides of the display area, and a breakpoint in the display area, wherein the first end and the second end are disposed within the non-display area. The display panel further comprises a plurality of gate driving chips (for example, gate-chip on film, G-COF), wherein an operational amplifier (OPA) is disposed in the gate driving chips. The present repair method comprises steps of S110-S150.

Step S110: disposing a repair line on the non-display area for transmitting a repair signal to the breakpoint of the target data line;

Step S120: dividing the repair line into a first segment, a second segment, and a third segment sequentially connected to each other;

Step S130: electrically connecting the first end of the target data line to an input end of the gate driving chip through the first segment;

Step S140: dividing the second segment of the repair line into a first part and a second part, wherein the second part is disposed in the gate driving chip, the input end of the gate driving chip is electrically connected with an input end of the operational amplifier (OPA) through the second part, and an output end of the operational amplifier (OPA) is electrically connected with the output end of the gate driving chip through the second part for amplifying the repair signal transmitted through the repair line; and the output end of the gate driving chip is electrically connected to an input end of the next gate driving chip through the first part;

Step S150: electrically connecting the last output end of the gate driving chip passing the second segment electrically to the second end of the target data line through the third segment, for transmitting the repair signal amplified by the operational amplifier (OPA) to the breakpoint through the second end of the target data line.

As above described, the second segment of the repair line is divided into the first part and the second part, wherein the second part is disposed in the gate driving chip, and the wiring process of the second part in the gate driving chip is usually more advanced than the wiring process of the non-display area of the display panel. Therefore, the impedance of the second part of the second segment of the repair line in the gate driving chip is far less than wirings in the non-display area and can be accordingly ignored, and the impedance and uniformity of the second part of the second segment of the repair line are better than the wirings in the non-display area. That is, according to the embodiment above-mentioned, the impedance of the present repair line wiring is far less than the impedance of conventional repair line wiring, so that the requirements for the operational amplifier (OPA) are reduced, cost for wiring process is reduced, and the wiring layout is easily implemented.

The above-mentioned step (S140) of connecting the input end and the output end of the gate driving chip with the input end and the output end of the operational amplifier (OPA) respectively through the second part, comprises: connecting the operational amplifier (OPA) in series between the input end and the output end of the gate driving chip through the second part for amplifying the repair signal transmitted through the repair line. Comparing with conventional repair line wirings all passing through the non-display area, the repair line wirings of the present invention are transmitted through both the non-display area and the gate driving chip, and the operational amplifier (OPA) is disposed in the gate driving chip for improving data driving capability of the repair line. According to the embodiment of the present invention, the transmission path of the repair line in the non-display area is shortened and the impedance of the repair line is also reduced, so that the requirements for the operational amplifier (OPA) are accordingly reduced. Although the output capability of the present operational amplifier (OPA) in the gate driving chip is lower than the output capability of conventional operational amplifier (OPA), the impedance of the present repair line is correspondingly reduced to meet the driving requirements of the operational amplifier (OPA). The operational amplifier (OPA) with improved repair line push capability is an operational amplifier (OPA) disposed in the gate driving chip, but not not an operational amplifier (OPA) disposed on the printed circuit board (PCB), so that the repair line wirings are optimized. The advantages of the present invention include that an original operational amplifier (OPA) in the gate driving chip can be used for improving push capability without using any extra operational amplifier (OPA), so that a circuit layout is optimized, and an extra operational amplifier (OPA) and mounting cost is saved. Therefore, product cost is reduced, and power consumption of the repair line is reduced, and effects for peripheral components are accordingly reduced.

In some embodiments of the present invention, the driving capability requirements of the operational amplifier (OPA) can be reduced with adding outer operational amplifier (OPA) with low driving capability, or by using a suitable operational amplifier (OPA) or a combination of a plurality of operational amplifiers (OPA) according to requirements in the current circuits.

Furthermore, the plurality of gate driving chips are connected to each other sequentially through the first part of the second segment of the repair line. All of the gate driving chips connected to each other sequentially through the first part can minimize the impedance of the repair line effectively.

Furthermore, the present repair method further comprises: electrically connecting the plurality of operational amplifiers (OPAs) of the gate driving chips in series through the second part of the second segment of the repair line for conducting and amplifying the repair signal in cascade. The present invention can both reduce the driving capability requirements for driving the operational amplifier (OPA) of the repair line and use the plurality of the operational amplifiers (OPAs) of the gate driving chips with low driving capability to increase the driving capability. If one operational amplifier (OPA) of the gate driving chip cannot fulfill the driving capability requirements, the plurality of the operational amplifiers (OPAs) of the gate driving chips with small driving push capability can be used for conducting and amplifying the repair signal in cascade to achieve the object of high load driving capability. A breakpoint can be driven by an operational amplifier (OPA) of one gate driving chip, and can also be driven by a combination of a plurality of operational amplifiers (OPAs) of a plurality of gate driving chips. That is, a signal of a source driving chip is outputted through an operational amplifier (OPA) of the first gate driving chip, inputted to an operational amplifier (OPA) of the second gate driving chip, amplified through driving push and inputted to the third gate driving chip, and so on. The plurality of the operational amplifiers (OPAs) of the gate driving chips with small driving push capability can be used for conducting and amplifying the repair signal in cascade to achieve the object of high load driving capability.

Optionally, the target data line includes a plurality of target sub-data lines. The repair line corresponds to the plurality of target sub-data lines to dispose a plurality of sub-repair lines. The second parts of the plurality of target sub-data lines electrically connect to different operational amplifiers (OPAs) of the gate driving chips respectively. The operational amplifiers (OPAs) are used for amplifying repair signals of the plurality of target sub-data lines.

For a plurality of breakpoints appeared in a plurality of data lines in the display panel, there are a plurality of sub-repair lines disposed corresponding to the plurality of data lines having the breakpoints, wherein the plurality of sub-repair lines are implemented by the techniques of the embodiments above-mentioned. The repair signals of the plurality of sub-repair lines are amplified through different operational amplifiers (OPAs) in the non-display area and in the gate driving chips, and the operational amplifiers (OPAs) in the gate driving chips. For example, if there are two data lines having breakpoints, two sub-repair lines are accordingly disposed and two operational amplifiers (OPAs) are disposed in the gate driving chips, wherein the two sub-repair lines pass through the two operational amplifiers (OPAs). Therefore, comparing with conventional repair lines, the present repair line wirings are reduced in the non-display area, the impedance of the present repair line is reduced, and the driving capability requirements for the operational amplifiers (OPAs) are also reduced. The present operational amplifiers (OPAs) of the gate driving chips can be used to complete a driving process. If one operational amplifier (OPA) of the gate driving chip cannot fulfill the driving capability requirements, the plurality of the operational amplifiers (OPAs) of the gate driving chips of the gate driving chips with small driving push capability can be used for conducting and amplifying the repair signal in cascade to achieve the object of high load driving capability ( 驱动大负载的效果 ).

Further optionally, the target data line includes a plurality of target sub-data lines. The repair line corresponds to the plurality of target sub-data lines to dispose a plurality of sub-repair lines. The first parts of the plurality of sub-repair lines electrically connect to different gate driving chips respectively. The repair signals of the plurality of target sub-data lines can be amplified through the operational amplifiers (OPAs) in the gate driving chips or through the outer operational amplifiers (OPAs).

For a plurality of breakpoints appeared in a plurality of data lines in the display panel, there are a plurality of sub-repair lines disposed corresponding to the plurality of data lines having the breakpoints, wherein the plurality of sub-repair lines are implemented by the techniques of the embodiments above-mentioned. The repair signals of the plurality of sub-repair lines are amplified through different operational amplifiers (OPAs) in the non-display area and in the gate driving chips, and through the operational amplifiers (OPAs) in the gate driving chips. For example, if there are two data lines having breakpoints, two sub-repair lines are accordingly disposed and pass through half of the gate driving chips respectively. Therefore, comparing with conventional repair lines, the present repair line wirings are reduced in the non-display area, the impedance of the present repair line is reduced, and the driving capability requirements for the operational amplifiers (OPAs) are also reduced. The present operational amplifiers (OPAs) of the gate driving chips are used for completing a driving process. If one operational amplifier (OPA) of the gate driving chip cannot fulfill the driving capability requirements, the plurality of the operational amplifiers (OPAs) of the gate driving chips of the gate driving chips with small driving push capability can be used for conducting and amplifying the repair signal in cascade to achieve the object of high load driving capability.

Figure 3:
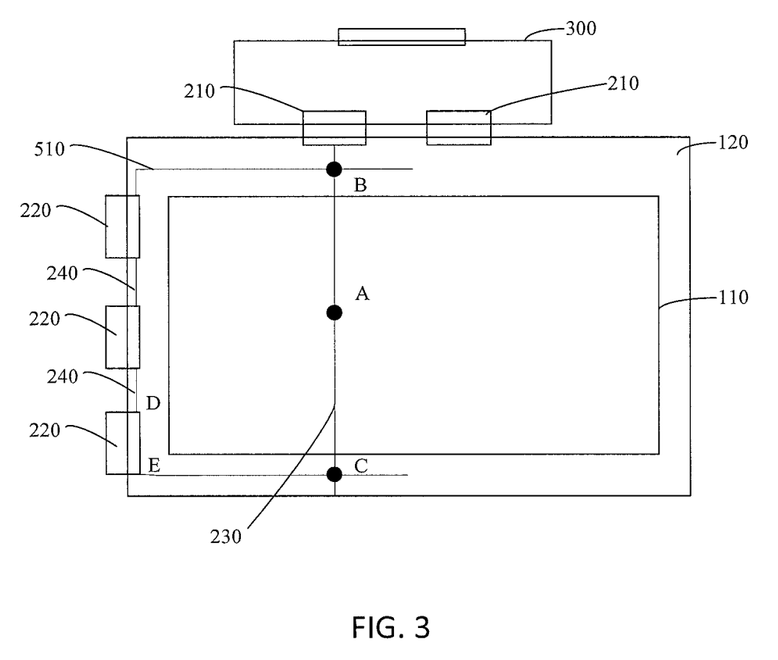
FIG. 3 shows a display panel according to an embodiment of the present invention.
Figure 4:
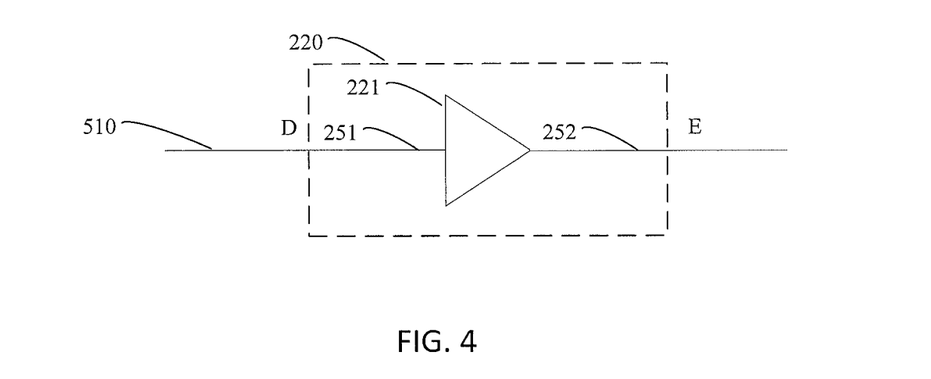
FIG. 4 shows a circuit structure of a gate driving chip of a display panel according to an embodiment of the present invention.

FIG. 3 shows a display panel according to an embodiment of the present invention. FIG. 4 shows a circuit structure of a gate driving chip of a display panel according to an embodiment of the present invention. Referring to both FIGS. 3 and 4, the present display panel comprises: a display area 110, a non-display area 120, a plurality of gate driving chips (for example, gate-chip on film, G-COF) 220, and a target data line 230. The target data line includes a first end B and a second end C disposed on both sides of the display area 110, and a breakpoint A in the display area 110, wherein the first end B and the second end C are disposed within the non-display area 120. An operational amplifier (OPA) 221 is disposed in the gate driving chips 220. The display panel further comprises a repair line 510 disposed in the non-display area 120 for transmitting repair signals to the breakpoint A of the target data line 230. The repair line 510 includes a first segment, a second segment, and a third segment sequentially connected to each other. The operational amplifier (OPA) 221 (not shown in FIG. 3) is electrically coupled to the repair line 510 for amplifying the repair signals transmitted by the repair line 510. Specifically, the first segment of the repair line 510 is used for electrically connecting the first end B of the target data line 230 to an input end of the gate driving chips 220. The second segment is divided into a first part 240 and a second part (not shown), wherein the second part is disposed in the gate driving chips 220. The second part is used for electrically connecting the input end of the gate driving chips 220 to an input end of the operational amplifier (OPA) 221, and for connecting an output end of the operational amplifier (OPA) 221 to an output end of the gate driving chips 220 for amplifying the repair signals transmitted by the repair line 510. The first part 240 is used for connecting the output end of one gate driving chips 220 to the input end of the next gate driving chips 220. The third segment is used for connecting the last output end E of the gate driving chips 220 to the second end C of the target data line 230. For repairing a disconnected line shown in FIG. 3, overlapping points B and C (the first end B and the second end C) of the repair line 510 and the target data line 230 are laser welded, so that data of the AB segment can be transmitted through the target data line 230 and data of the AC segment can be transmitted through the repair line 510 to implement a repairing process.

The second segment of the repair line 510 passes through the gate driving chips 220. The wiring process of the second part of the second segment in the gate driving chip is more advanced than the wiring process in the non-display area 120 of the display panel. Therefore, the impedance of the second part of the second segment of the repair line 510 in the gate driving chips 220 is far less than wirings in the non-display area and can be accordingly ignored, and the impedance and uniformity of the second part of the second segment of the repair line 510 is better than the wirings in the non-display area 120. The impedance of the present repair line wiring 510 is far less than the impedance of conventional repair line wiring, so that the requirements for the operational amplifier (OPA) are reduced, and the cost for wiring process is reduced, and the wiring layout is easily implemented. The driving capability requirements of the operational amplifier (OPA) can be reduced with adding outer operational amplifier (OPA) with low driving capability, or by using a suitable operational amplifier (OPA) or a combination of a plurality of operational amplifiers (OPA) according to requirements in the current circuits.

The operational amplifier (OPA) 221 is disposed in the gate driving chips 220. The second part includes a front wiring part 251 connecting the input end of the gate driving chips 220 to the input end of the operational amplifier (OPA) 221, and a rear wiring part 252 connecting the output end of the operational amplifier (OPA) 221 to the output end of the gate driving chips 220. If the gate driving chip 220 is the last one, the input end D is connected to the repair line 510, and the output end E is connected to the second end C of the target data line 230.

Comparing with conventional repair line wirings all passing through the non-display area, the repair line wirings of the present invention are transmitted through both the non-display area 120 and the gate driving chip 220. The operational amplifier (OPA) 221 is disposed in the gate driving chip 220 for improving data driving capability of the repair line 510. According to the embodiment of the present invention, the transmission path of the repair line 510 in the non-display area 120 is shortened and the impedance of the repair line 510 is also reduced, so that the requirements for the output capability of the operational amplifier (OPA) are accordingly reduced. Although the output capability of the present operational amplifier (OPA) in the gate driving chip 220 is lower than the output capability of conventional operational amplifier (OPA), the impedance of the present repair line 510 is correspondingly reduced to meet the driving requirements. The operational amplifier (OPA) 221 with improved repair line push capability is an operational amplifier (CPA) disposed in the gate driving chip 220, but not conventional operational amplifier (OPA) disposed on the printed circuit board (PCB), so that the repair line wirings 510 is optimized. The advantages of the present invention include that an original operational amplifier (OPA) 221 in the gate driving chip 220 can be used for improving push capability without using any extra operational amplifier (OPA), so that a circuit layout is optimized, and an extra operational amplifier (OPA) and mounting cost is saved. Therefore, product cost is reduced, and power consumption of the repair line 510 is reduced, and effects for peripheral components are accordingly reduced.

Furthermore, the plurality of gate driving chips 220 are connected to each other sequentially through the first part 240 of the repair line 510. All of the gate driving chips 240 connected to each other sequentially through the first part 240 can minimize the impedance of the repair line 510 effectively.

Furthermore, the plurality of operational amplifiers (OPAs) of the gate driving chips are electrically connected to each other in series through the second part of the second segment of the repair line 510 for conducting and amplifying the repair signal in cascade. The present invention can both reduce the driving capability requirements for driving the operational amplifier (OPA) of the repair line and use the plurality of the operational amplifiers (OPAs) of the gate driving chips with low driving capability to increase the driving capability. If one operational amplifier (OPA) of the gate driving chip cannot fulfill the driving capability requirements, the plurality of the operational amplifiers (OPAs) of the gate driving chips of the gate driving chips with small driving push capability can be used for conducting and amplifying the repair signal in cascade to achieve the object of high load driving capability. A breakpoint can be driven by an operational amplifier (OPA) of one gate driving chip, and can also be driven by a combination of a plurality of operational amplifiers (OPAs) of a plurality of gate driving chips. That is, a signal of a source driving chip is outputted through an operational amplifier (OPA) of the first gate driving chip, inputted to an operational amplifier (OPA) of the second gate driving chip, amplified through driving push and inputted to the third gate driving chip, and so on. The plurality of the operational amplifiers (OPAs) with small driving push capability can be used for conducting and amplifying the repair signal in cascade to achieve the object of high load driving capability.

Optionally, the target data line includes a plurality of target sub-data lines. The repair line corresponds to the plurality of target sub-data lines to dispose a plurality of sub-repair lines. The second parts of the plurality of sub-repair lines are electrically connected to different operational amplifiers (OPAs) in the gate driving chips respectively.

For a plurality of breakpoints appeared in a plurality of data lines in the display panel, there are a plurality of sub-repair lines disposed corresponding to the plurality of data lines having the breakpoints, wherein the plurality of sub-repair lines are implemented by the techniques of the embodiments above-mentioned. The repair signals of the plurality of sub-repair lines are amplified through different operational amplifiers (OPAs) in the non-display area 120 and in the gate driving chips 220, and through the operational amplifiers (OPAs) in the gate driving chips 220. For example, if there are two data lines having breakpoints, two sub-repair lines are accordingly disposed and through two operational amplifiers (OPAs) in the gate driving chips respectively. Therefore, comparing with conventional repair lines, the present repair line wirings are reduced in the non-display area, the impedance of the present repair line is reduced, and the driving capability requirements for the operational amplifiers (OPAs) are also reduced. The present operational amplifiers (OPAs) of the gate driving chips are used for completing a driving process. If one operational amplifier (OPA) of the gate driving chip cannot fulfill the driving capability requirements, the plurality of the operational amplifiers (OPAs) of the gate driving chips of the gate driving chips with small driving push capability can be used for conducting and amplifying the repair signal in cascade to achieve the object of high load driving capability.

Further optionally, the target data line includes a plurality of target sub-data lines. The repair line corresponds to the plurality of target sub-data lines to dispose a plurality of sub-repair lines. The first parts of the plurality of sub-repair lines electrically connect to different gate driving chips respectively.

For a plurality of breakpoints appeared in a plurality of data lines in the display panel, there are a plurality of sub-repair lines disposed corresponding to the plurality of data lines having the breakpoints, wherein the plurality of sub-repair lines are implemented by the techniques of the embodiments above-mentioned. The repair signals of the plurality of sub-repair lines are amplified through different operational amplifiers (OPAs) in the non-display area and in the gate driving chips, and through the operational amplifiers (OPAs) in the gate driving chips. For example, if there are two data lines having breakpoints, two sub-repair lines are accordingly disposed and pass through half of the gate driving chips respectively. Therefore, comparing with conventional repair lines, the present repair line wirings are reduced in the non-display area, the impedance of the present repair line is reduced, and the driving capability requirements for the operational amplifiers (OPAs) are also reduced. The present operational amplifiers (OPAs) of the gate driving chips are used for completing a driving process. If one operational amplifier (OPA) of the gate driving chip cannot fulfill the driving capability requirements, the plurality of the operational amplifiers (OPAs) of the gate driving chips of the gate driving chips with small driving push capability can be used for conducting and amplifying the repair signal in cascade to achieve the object of high load driving capability.

Figure 5:
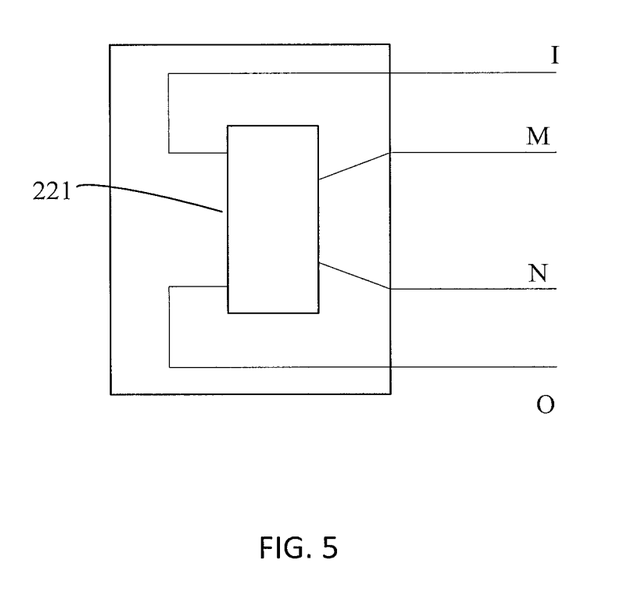
FIG. 5 shows an electrically connecting structure of a gate driving chip of a display panel according to an embodiment of the present invention.

FIG. 5 shows an electrically connecting structure of a gate driving chip of a display panel according to an embodiment of the present invention. The present repair line includes an I point and an O point, wherein the I point is electrically connected to the input end of the operational amplifier (OPA) 221 in the gate driving chips, and the O point is electrically connected to the output end of the operational amplifier (OPA) 221 in the gate driving chips. A scan line includes an M point and an N point, wherein the M point is electrically connected to a gate turn-on signal of a first output line of the thin film transistors (TFTs) for controlling display panel, and the N point is electrically connected to a gate turn-on signal of a last output line of the thin film transistors (TFTs) for controlling display panel. Therefore, the repair signal of the present repair line would not conflict with the scan signal of the scan line, and the added wirings above-mentioned would not influence the functions of original components since the gate driving chip itself is a component being able to transmit high-voltage (for example, 30V) signals.

In the above-mentioned embodiments of the present invention, the function of every operational amplifier (OPA) is used for strengthening the driving capability. For example, a single magnification function is that an output signal is equal to an input signal, an output voltage can be remained the same, while an output current capability can be improved for reducing a waveform distortion due to the effects of the back-end load. Of course, every operational amplifier (OPA) can also be disposed to provide a multiple magnification according to requirements.

In one embodiment of the present invention, the display panel can be, but not limited to, a twisted nematic (TN) display panel, an optically compensated birefringence (OCB) display panel, or a vertical alignment (VA) display panel. In addition, the display panel can be, but not limited to, a RGB three-primary-color display panel, a RGBW four-primary-color display panel, or a RGBY four-primary-color display panel. And, the display panel could be a curved surface display panel Furthermore, the display panel can also be an organic light-emitting diode (OLED) display panel, a quantum-dot light-emitting diode (QLED) display panel, a flexible display panel, or other type display panel.

The above-mentioned embodiments of the present invention can make any combination. For concise description, all possible and variety combinations of the individual features of the above embodiments are not described. However, if these possible and variety combinations would not conflict to each other, they are still within the range and spirit of the present invention.

The present invention has been described in considerable detail with reference to certain preferred embodiments thereof. It should be understood that the description is for illustrative purpose, not for limiting the scope of the present invention. Those skilled in this art can readily conceive simple or equivalent variations and modifications, which are still within the spirit of the present invention. The protection scope of the present invention shall be subject to the accompanying claims

What is claimed is:

1. A repair method of a display panel, the display panel comprising: a display area, a non-display area, and a target data line, the target data line including a first end and a second end disposed on both sides of the display area, and the target data line including a breakpoint in the display area; the display panel further comprising a plurality of gate driving chips, wherein each of operational amplifiers is disposed in the corresponding gate driving chip, and the repair method of the display panel comprises steps of:
    disposing a repair line on the non-display area for transmitting a repair signal to the breakpoint of the target data line;
    dividing the repair line into a first segment, a second segment, and a third segment sequentially connected to each other;
    electrically connecting the first end of the target data line to an input end of the first one of the gate driving chips through the first segment;
    dividing the second segment of the repair line into a first part and a second part, wherein the second part is disposed in each of the gate driving chips, an input end of each of the gate driving chips is electrically connected to an input end of the corresponding operational amplifier through the second part, and an output end of each of the gate driving chips is electrically connected to an output end of the corresponding operational amplifier through the second part for amplifying the repair signal transmitted through the repair line;
    electrically connecting the output end of the first one of the gate driving chips to the input end of the next one of the gate driving chips through the first part; and
    electrically connecting the output end of the last one of the gate driving chips to the second end of the target data line through the third segment, for transmitting the repair signal amplified by all of the operational amplifiers to the breakpoint through the second end of the target data line.

2. The repair method of a display panel according to claim 1, further comprising: sequentially connecting the plurality of gate driving chips to each other through the first part of the second segment of the repair line.

3. The repair method of a display panel according to claim 1, further comprising: electrically connecting operational amplifier (OPA) of the gate driving chips in series through the second part of the second segment.

4. The repair method of a display panel according to claim 3, wherein the operational amplifiers (OPAs) are electrically connected in series through the second part of the second segment for conducting and amplifying the repair signal in cascade.

5. The repair method of a display panel according to claim 1, wherein the target data line includes a plurality of target sub-data lines.

6. The repair method of a display panel according to claim 5, wherein a plurality of sub-repair lines are disposed in the repair line corresponding to the plurality of target sub-data lines.

7. The repair method of a display panel according to claim 6, wherein second parts of the plurality of sub-repair lines are electrically connected to the different operational amplifiers (OPAs) in the gate driving chips respectively.

8. The repair method of a display panel according to claim 1, wherein the target data line includes a plurality of target sub-data lines.

9. The repair method of a display panel according to claim 8, wherein a plurality of sub-repair lines are disposed in the repair line corresponding to the plurality of target sub-data lines.

10. The repair method of a display panel according to claim 9, wherein first parts of the plurality of sub-repair lines are electrically connected to the different gate driving chips respectively.

11. A display panel comprising:
a display area;
a non-display area;
a plurality of gate driving chips, wherein each of operational amplifiers is disposed in the corresponding gate driving chip;
a target data line, the target data line including a first end and a second end disposed on both sides of the display area, and including a breakpoint in the display area;
a repair line disposed in the non-display area for transmitting repair signals to the breakpoint of the target data line, the repair line including a first segment, a second segment, and a third segment sequentially connected to each other;
the first segment disposed for electrically connecting the first end of the target data line to an input end of the first one of the gate driving chips;
the second segment divided into a first part and a second part, wherein the second part is disposed in each of the gate driving chips, the second part is used for electrically connecting an input end of each of the gate driving chips to an input end of the corresponding operational amplifier, and for electrically connecting an output end of each of the gate driving chips to an output end of the corresponding operational amplifier for amplifying the repair signals transmitted by the repair line, and the first part is used for electrically connecting the output end of the first one of the gate driving chips to the input end of the next one of the gate driving chips; and
the third segment disposed for electrically connecting the output end of the last one of the gate driving chips to the second end of the target data line.

12. The display panel according to claim 11, further comprising: the plurality of gate driving chips electrically connected to each other through the first part of the second segment of the repair line.

13. The display panel according to claim 11, wherein the operational amplifiers (OPAs) of the gate driving chips are electrically connected in series through the second part of the second segment for conducting and amplifying the repair signals in cascade.

14. The display panel according to claim 11, wherein the target data line includes a plurality of target sub-data lines.

15. The display panel according to claim 14, wherein a plurality of sub-repair lines are disposed in the repair line corresponding to the plurality of target sub-data lines.

16. The display panel according to claim 15, wherein second parts of the plurality of sub-repair lines are electrically connected to the different operational amplifiers (OPAs) in the gate driving chips respectively.

17. The display panel according to claim 11, wherein the target data line includes a plurality of target sub-data lines.

18. The display panel according to claim 17, wherein a plurality of sub-repair lines are disposed in the repair line corresponding to the plurality of target sub-data lines.

19. The display panel according to claim 18, wherein first parts of the plurality of sub-repair lines are electrically connected to the different gate driving chips respectively.

20. A display panel comprising:
a display area;
a non-display area;
a plurality of gate driving chips, wherein each of operational amplifiers is disposed in the corresponding gate driving chip;
a target data line, the target data line including a first end and a second end disposed on both sides of the display area, and including a breakpoint in the display area;
a repair line disposed in the non-display area for transmitting repair signals to the breakpoint of the target data line, the repair line including a first segment, a second segment, and a third segment sequentially connected to each other;
the plurality of operational amplifiers (OPAs) electrically connected to the repair line for amplifying the repair signals transmitted by the repair line;
the first segment disposed for electrically connecting the first end of the target data line to an input end of the first one of the gate driving chips;
the second segment divided into a first part and a second part, wherein the second part is disposed in each of the gate driving chips, the second part is used for electrically connecting an input end of each of the gate driving chips to an input end of the corresponding operational amplifier, and for electrically connecting an output end of each of the gate driving chips to an output end of the corresponding operational amplifier for amplifying the repair signals transmitted by the repair line, the operational amplifiers (OPAs) of all of the gate driving chips are electrically connected in series through the second part of the second segment for conducting and amplifying the repair signals in cascade, and the first part is used for sequentially connecting all of the gate driving chips to each other; and
the third segment disposed for electrically connecting the output end of the last one of the gate driving chips to the second end of the target data line.

* * * * *